Patented Oct. 27, 1925.

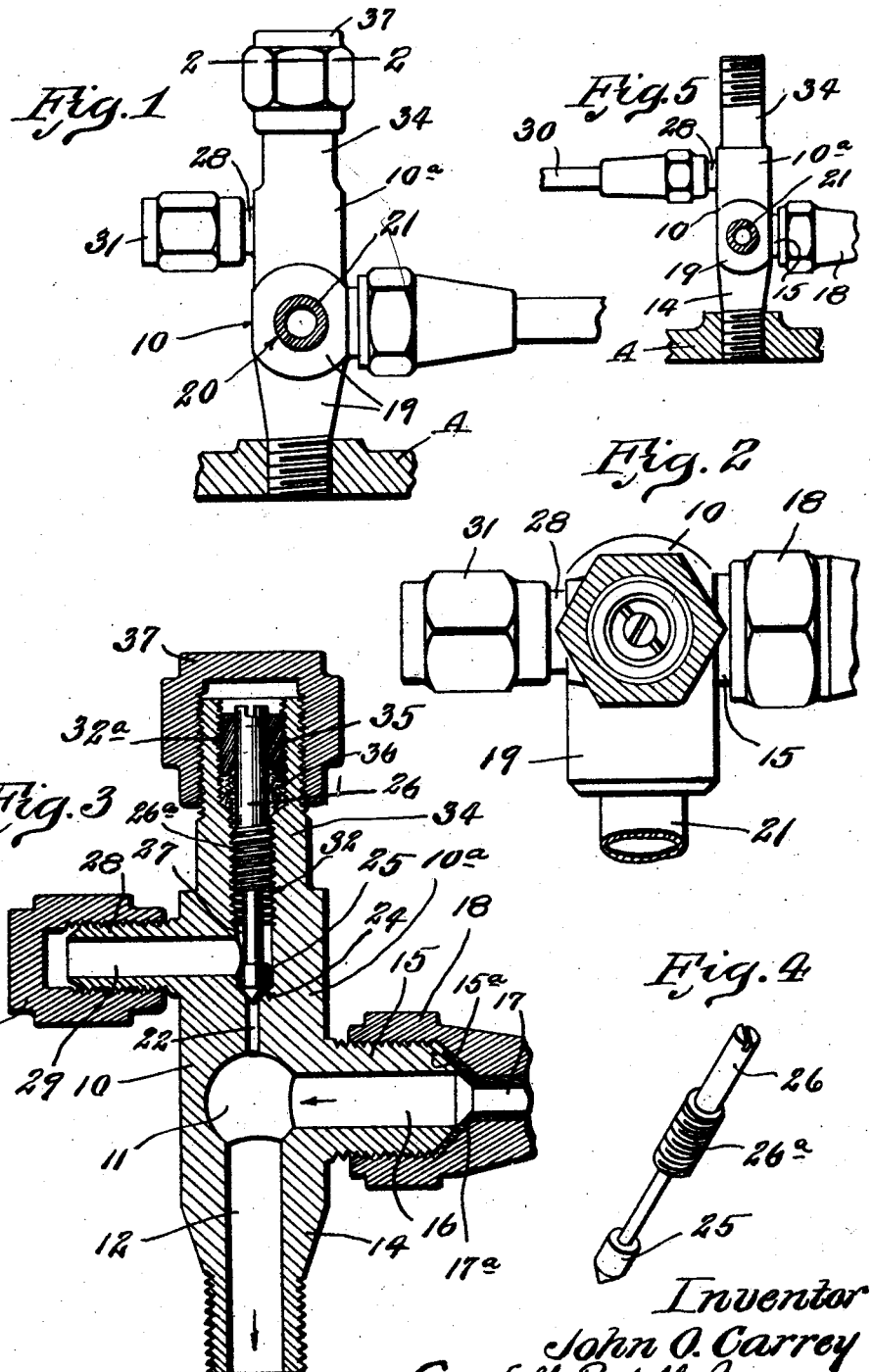

1,559,222

UNITED STATES PATENT OFFICE.

JOHN O. CARREY, OF ST. LOUIS, MISSOURI, ASSIGNOR TO CARREY ROTARY ENGINE COMPANY, OF ST. LOUIS, MISSOURI, A CORPORATION OF MISSOURI.

CHARGING VALVE.

Application filed November 4, 1924. Serial No. 747,863.

*To all whom it may concern:*

Be it known that I, JOHN O. CARREY, a citizen of the United States, residing at St. Louis, Missouri, have invented a certain new and useful Improvement in Charging Valves, of which the following is a specification, such as will enable others skilled in the art to which it appertains to make and use the same.

This invention relates to new and useful improvements in valves and the objects of the invention are to provide a valve which is particularly adapted for use in connection with refrigerating systems, said valve being utilized in charging the system with the compressible refrigerant.

Further objects of the invention are to provide a valve adapted to be connected to a compressor and having a plurality of extensions or nipples adapted to receive various connections necessary to place the refrigerating system with which said compressor is adapted in operative condition.

With these and other objects in view, my invention consists in certain novel features of construction and arrangement of parts, hereinafter more fully described and claimed, and illustrated in the accompanying drawings, in which—

Figure 1 is a top plan view of the valve.

Figure 2 is a vertical cross section taken on lines 2—2 of Figure 1.

Figure 3 is a horizontal cross section taken through the valve.

Figure 4 is a perspective detail view of the valve stem.

Figure 5 is a top plan view showing the valve connected to charge the system with refrigerant.

In preparing the refrigerating system of the type using compressible refrigerant in condition for operating, it is first necessary before admitting the refrigerant thereinto to rid said system of the air and produce vacuum therein. In order to effect these exhausting and charging operations in an efficient and satisfactory manner, I provide a valve which is connected to the inlet of the compressor and is provided with a plurality of nipples or extensions to which can be connected, respectively, the return pipe of the refrigerating system, an exhaust and charging connection, and a combination vacuum and pressure gage. A regulating valve is provided by means of which the exhaust and discharge connection can be shut at the appropriate moment without disturbing the other connections.

Referring by numerals to the accompanying drawings, 10 indicates a body portion of the valve, said body portion being provided with a chamber 11 with which communicates a longitudinally disposed bore 12 formed in a tubular extension 14 which is threaded at its end and adapted to be screw-seated in the inlet of a compressor wall A. Extending laterally from body 10 is a tubular extension 15 having a longitudinally disposed bore 16 which communicates with chamber 11. Extension 15 is adapted to be connected to the end of a return pipe 17 of the refrigerating system and is held preferably in position by a cap 18 which is threaded on said extension and clamps the flared end 17$^a$ of said pipe to tapered end or nozzle 15$^a$ of extension 15.

Body portion 10 is provided with a lateral extension 19, preferably disposed on the same horizontal plane with and at right angles to extension 17. This extension 19 is provided with a bore 20 leading into chamber 11 and threaded at its outer end for receiving a stem 21 of a suitable vacuum and pressure gage by means of which the operator can inform himself of the operating conditions existing in the system.

Leading from chamber 11 in the opposite direction to the bore 12 is a small bore 22 which terminates in a valve seat 24 adapted to receive a valve 25 carried by the inner end of a valve stem 26. Bore 22 connects chamber 11 with a chamber 27 which latter is formed in the upper portion 10$^a$ of casing 10 and this communication is controlled by valve 25. Extending laterally from portion 10$^a$ is a tubular extension 28 having a bore 29 which connects with the chamber 27. Extension 28 is adapted to have connected thereto one end of a connection 30 through which the refrigerating system is first exhausted of the air and then charged with the compressible refrigerant. When the system has been charged, valve 25 is seated, connection 30 is then removed from extension 28 and the latter is sealed by a cap 31.

Valve stem 26 is provided with a threaded portion 26ª which is screw-seated in the threaded bore 32 formed in a tubular extension 34, said bore 32 being a continuation of chamber 27. Bore 32 terminates in an enlarged bore 32ª in which is screw-seated an apertured plug or packing gland 35 which serves to securely press packing material 36 around the stem 26, thereby providing an effective seal. The outer end of said stem projects through said plug 35 and is grooved so that it can be adjusted by means of a screw driver. The end of tubular extension 34 is exteriorly threaded and receives a cap 37.

In using the valve, the extension 14 is screwed in position on the compressor, outlet 15 is connected to the return pipe 17 of the system and outlet 28 is connected to pipe 30 of the exhausting and charging apparatus, while stem 21 of a vacuum and pressure gauge is screwed in bore 20. Cap 37 is removed and valve stem 26 operated to unseat valve 25, whereby the system can be exhausted of air and charged with the compressible refrigerant. The degree of vacuum, as well as the pressure of the system, can be ascertained by means of the gauge. When the system has been charged to the desired degree of pressure, stem 26 is operated to seat valve 25 and thereby close the communication between the charging apparatus and the system, whereupon the pipe 30 of said apparatus can be disconnected from the valve.

A cap 31 is placed on outlet 28 and cap 37 is placed over extension 34, thereby preventing tampering with the valve stem 26.

The valve fitting is formed of a single piece, is provided with appropriate number of outlets, so that proper connections can be made without disturbing the connection between said valve and the system.

A valve of my improved design is simple in construction and operation and can be provided at low cost.

Obviously various minor changes in the construction of my valve can be made and substituted for those herein shown and described without departing from the spirit of my invention.

I claim:

1. A valve fitting for refrigerating systems comprising a single piece casting adapted to be connected to the inlet port of a compressor and provided with an extension adapted to be connected to one end of a refrigerating system, said fitting having a plurality of outlets for receiving respectively the exhausting and charging connections and a valve-controlled bore connecting said extensions with certain of said outlets.

2. A valve fitting for refrigerating systems comprising a single piece casting adapted to be connected to the inlet port of a compressor and provided with an extension adapted to be connected to one end of a refrigerating system, a plurality of outlets for receiving respectively the exhausting and charging connections and an indicating instrument, and a valve adjustably seated in said casting for controlling the communication between said exhausting and charging extension and said system.

3. A valve fitting for refrigerating systems comprising a single piece casting provided with an outlet adapted to be secured to the inlet port of a refrigerating system, an intake tubular portion adapted to receive the return pipe of said system, said casting being provided with a circulation passage communicating with said outlet and intake connections, a tubular extension formed integral with said casting and communicating with said circulation passage, said extension being adapted to be connected to an exhausting and charging apparatus, and a manipulative valve for controlling the communication between said exhausting and charging extension and said circulation passage.

4. A valve fitting for refrigerating systems comprising a casting provided with integral inlet and outlet connections adapted to be connected with the respective terminals of a refrigerating system, there being a circulation chamber formed in said casting communicating with said connections, a tubular extension projecting laterally from said casting and adapted to be connected to a charging apparatus, a valve controlled bore connecting said charging extension with said chamber.

5. A valve fitting for refrigerating systems comprising a single piece casting having a body portion formed with a circulation passage and having inlet and outlet extensions communicating with said circulation passage and adapted to be connected to the respective terminals of a refrigerating system, and a tubular charging and exhausting extension, and a valve-controlled bore connecting the circulation passage and said charging and exhausting extension.

6. A charging, exhausting, and circulating refrigeration fitting comprising a casting provided with an integral circulation passage and a tubular charging and exhausting extension, and a valve-controlled bore connecting the circulation passage with said charging and exhausting extension.

7. A charging, exhausting, and circulating refrigeration fitting comprising a casting provided with an integral circulation passage and a plurality of tubular extensions, one of which is adapted to be connected to a charging and exhausting device, and a valve-controlled bore connecting said circulation passage and said charging and exhausting extension.

8. A charging, exhausting, and circulating refrigeration fitting comprising a casting provided with an integral circulation passage and a plurality of tubular extensions, one of which is adapted to be connected to a charging and exhausting device, a valve-controlled bore connecting said circulation passage and said charging and exhausting extension, and a detachable cap for sealing said charging and exhausting extension.

In testimony whereof I hereunto affix my signature this 31st day of October, 1924.

JOHN O. CARREY.